Sept. 15, 1942.   A. C. LINDGREN   2,296,216
PLANTER
Filed Nov. 25, 1938   3 Sheets-Sheet 1

Inventor
Alexus C. Lindgren
By
Atty.

Sept. 15, 1942.　　　A. C. LINDGREN　　　2,296,216
PLANTER
Filed Nov. 25, 1938　　　3 Sheets-Sheet 2

Inventor
Alexus C. Lindgren
By V. F. Lavaune
Att'y.

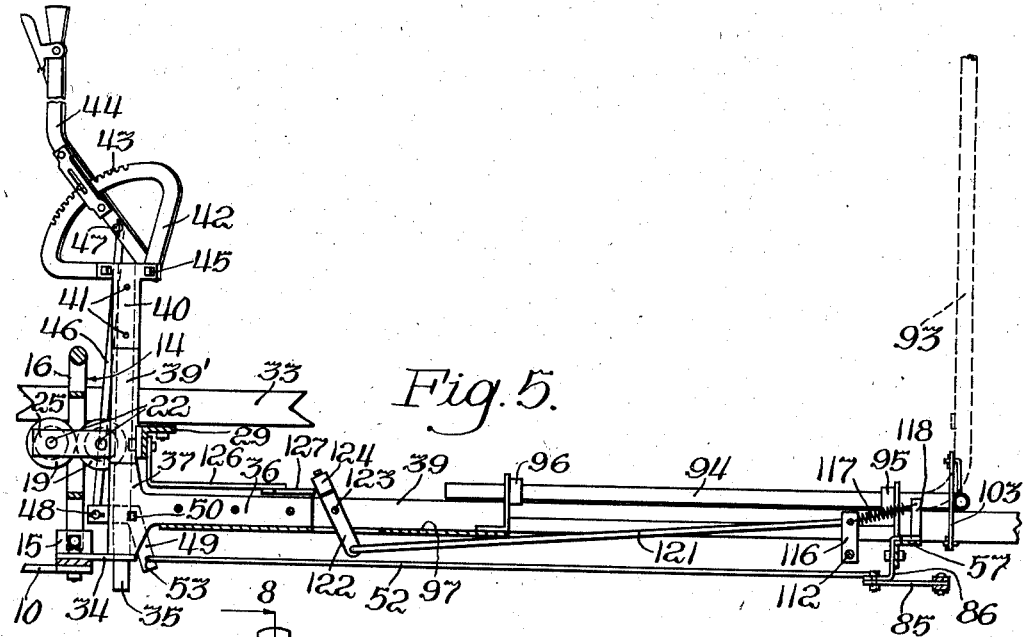
Sept. 15, 1942.   A. C. LINDGREN   2,296,216
PLANTER
Filed Nov. 25, 1938   3 Sheets-Sheet 3
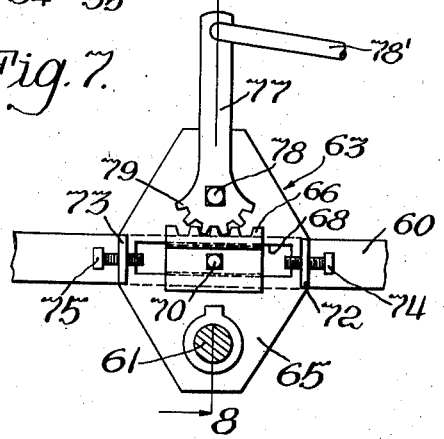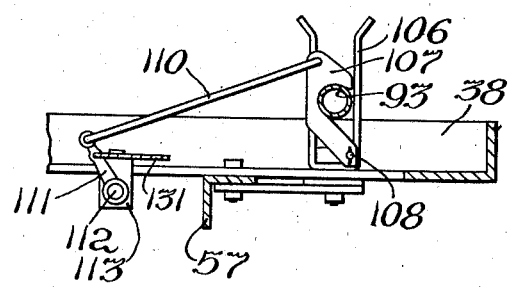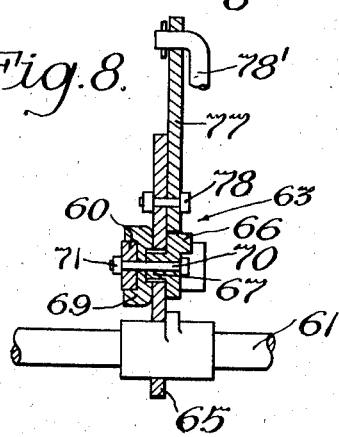
Inventor
Alexus C. Lindgren
By V. F. Lavergne
Atty.

Patented Sept. 15, 1942

2,296,216

UNITED STATES PATENT OFFICE 2,296,216

PLANTER

Alexus C. Lindgren, Chicago, Ill., assignor to International Harvester Company, a corporation of New Jersey Application November 25, 1938, Serial No. 242,203

16 Claims. (Cl. 111—48)

This invention relates to a planter. More specifically it relates to a corn planter of the cross-check-wire type, in which a check-wire is received at one side of the planter and is laid down at the other side.

In planters of the type which receive a check-wire at one side and lay it down at the other side, there is always the problem of properly releasing the check-wire when turns are to be made. Furthermore, there is the problem of making a planter follow directly behind a tractor which pulls it, since the drag in the check-head of a check-wire at one side of the planter tends to make the planter run out of line. Any slope of the ground laterally of the direction of travel of the tractor and planter also tends to make the planter run slightly to one side of the tractor. All valves on a check-row planter are operated simultaneously, and, if the planter does not travel in a direct line forwardly, the check will not be accurate. This is especially true of a wide four-row planter.

An object of the present invention is the provision of an improved planter.

Another object is the provision of a planter which will resist the tendency to move out of a line directly behind the tractor which pulls it.

A further object is to provide a means for throwing the check-wire clear of the planter when turns are made, in a planter which receives the check-wire at one side and lays it down at the other side.

Other objects will appear from the disclosure.

According to the present invention, check-wire sheaves are fixed at the rear of and outwardly of both sides of a tractor. A planter is pivotally attached to the tractor. A check-wire is received over one sheave at one side of the tractor, runs across over the sheave at the other side, and is laid down at the other side of the tractor. A spring controlled arm is pivoted at the center of the planter and has its free end under the part of the check-wire which is being laid down. When a turn is made, the arm is released, so that it throws the check-wire clear of the planter. The planter has two axles, each supported by wheels, and these axles are normally in alinement, but can be turned slightly out of alinement by means under the control of the operator at the tractor, which adjusts one end of each axle with respect to the planter frame. In this way, the tendency of the planter to run out of a line directly behind the tractor is resisted, whether this tendency be caused by the particular check-wire arrangement or by the running of the planter over ground sloping laterally of the planter.

In the drawings—

Figure 5 is a section taken along the line 5—5 of Figure 1;

Figure 6 is a section taken along the line 6—6 of Figure 1;

Figure 7 is a section taken along the line 7—7 of Figure 1;

Figure 8 is a section taken along the line 8—8 of Figure 7; and,

Figures 1, 9:
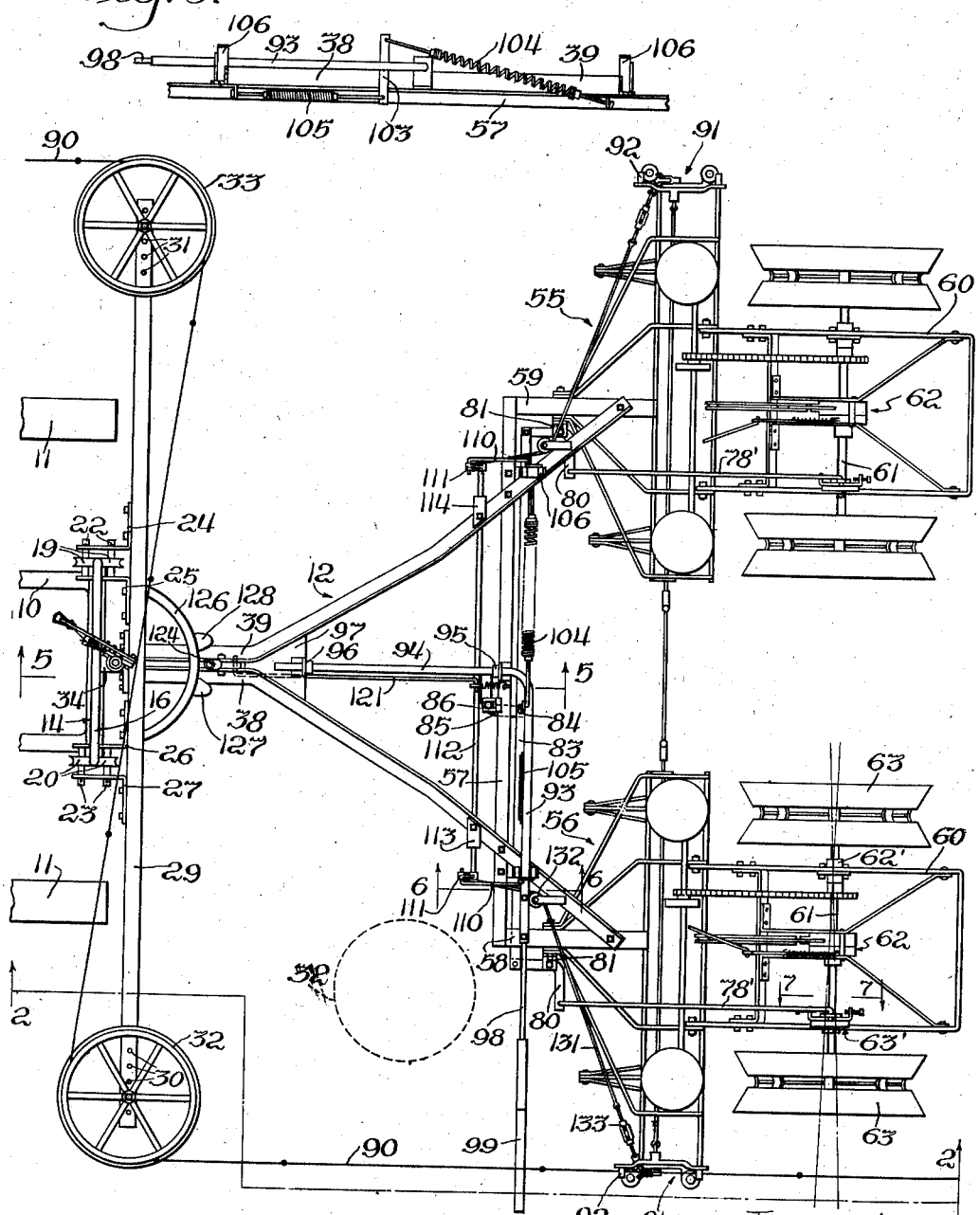
Figure 1 is a plan view of the improved planter, showing its attachment to the rear end of a tractor.
Figure 9 is a detail, showing the arm used for throwing the check-wire clear of the planter.
Figure 3:
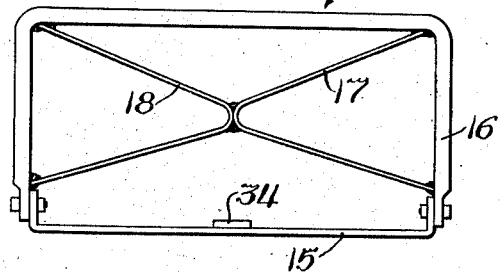
Figure 3 is a detail, showing the framework, by means of which the cross member supporting the check-wire sheaves is attached to the tractor.
Figure 4:
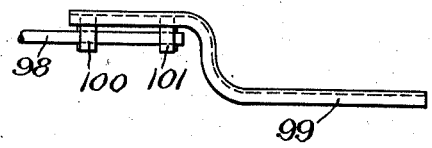
Figure 4 is a detail, showing the end of the spring controlled arm employed for throwing the check-wire clear of the planter.

As seen in Figure 1, there are a U-shaped draw-bar 10 and rear wheels 11 of a tractor, not shown. At the rear of the draw-bar is a corn planter 12. The attachment of this corn planter to the draw-bar 10 may best be seen in Figures 3 and 5. A framework 14 is attached to the draw-bar by means of a member 15. As part of the framework, there is also an upright U-shaped member 16 reenforced by bracing members 17 and 18. The U-shaped member 16 is of circular section and has at either side, in engagement therewith, pairs of rollers 19 and 20. These rollers 19 and 20 are supported, respectively, on pins 22 and 23. The pins 22 are carried in brackets 24 and 25, and the pins 23, in brackets 26 and 27. Each of these brackets is bolted to an angle member 29, which extends laterally of the tractor beyond each of the rear wheels 11 and carries at its ends, in suitable holes 30 and 31, check-wire sheaves 32 and 33.

A piece 34 is bolted at the center of the draw-bar 10 on top of the member 15. An elongated pin 35 extends vertically through an opening in this piece 34 rearwardly of the draw-bar. A casting 36 has a sleeve portion 37 around the pin 35 just above the piece 34. Angle members 38 and 39 are bolted to the sides of the casting 36 and form a part of the frame of the planter. Resting on top of the sleeve portion 37 of the casting 36 is a casting 39', through which the pin 35 extends and to which the angle member 29 is bolted. On top of this casting 39' is another sleeve 40, which is pinned to the pin 35, as at 41. A bent member 42, having an arcuate toothed portion 43, is attached to the sleeve 40. A lever 44 with detent mechanism thereon is pivoted, as at 45, to the member 42. A link 46 is connected at one end at 47 on the lever 44 and at the other end at 48 on a bell crank 49 pivoted at 50 on the casting 36. A link 52 is pivoted on the other arm of the bell crank 49, as at 53, and extends rearwardly of the corn planter, forming part of a control mechanism, which will presently be described.

The seed dropping mechanism and drive therefor form no part of the present invention and are of the type shown in the patent to Ford No. 1,443,173, dated January 23, 1923. Briefly, there are planting units 55 and 56 carried alongside of one another with a common drive mechanism under actuation of a single check-wire for releasing seed corn from the usual hopper mechanisms of the planters. The angle members 38 and 39, previously referred to, are parallel for a short portion of their lengths and then extend outwardly away from one another. A transverse angle member 57 is connected near the outer ends of the angle members 38 and 39, and short, longitudinally extending members 58 and 59 are attached at its ends and to the very ends of the angle members 38 and 39. Each of the planting units 55 and 56 has framework 60 connected to the members 58 and 59. An axle 61 supports each framework 60, and there is power lifting mechanism 62 connected therewith for lifting the planting units from planting position to transport position. This power lifting mechanism forms no part of the present invention and is of the type shown in the patent to Towle No. 1,378,432, dated May 17, 1921.

A novel arrangement for angling each axle 61 with respect to the framework 60 will now be described. Since the arrangement is identical for both planting units, only the one on planting unit 56 will be referred to. At the ends of the axle 61 there are covering wheels 63. The axle is supported at 62' near one end in fixed relation with the framework 60. The support 63' adjacent the other end of the axle is shiftable and allows a shifting of the axle with respect to the framework. The details of this may be seen in Figures 7 and 8. The axle 61 is carried in a plate member 65, slidably held against the framework 60 by a rack member 66, which has a portion 67 extending through an elongated slot 68 in the plate member 65 and in the framework 60. A reenforcing member 69 rests against the inner side of the framework 60, which, from Figure 8, is seen to be of channel section. A bolt 70 and nut 71 hold all of the parts together. Ears 72 and 73 extend laterally from the sides of the plate member 65 and receive screws 74 and 75, which are adapted to serve as adjustable limits for the plate member 65 in its movement with respect to the rack 66 and framework 60. A lever 77 is pivotally connected at 78 adjacent one end to the plate member 65 and has at that end an arcuate toothed portion 79 which engages the rack 66. The other end of the lever 77 has a link 78' pivotally attached thereto, which is connected at its other end to one arm of a bell crank 80 (Figure 1) pivotally supported on a bracket member 81. A cross link 83 connects the bell cranks 80 of each planting unit. Adjacent a mid-point 84 of the link 83, one end of a bell crank 85 is attached, which is pivotally supported on a bracket member 86 connected to the member 57. The link 52 previously referred to is connected to the other end of the bell crank 85. It will be seen from the arrangement of parts just described and the connection of the link 52 with the lever 44 previously described that an adjustment of one end of each axle 61 is had by movement of the lever 44 up or down with respect to the arcuate toothed portion 43. Adjustment of the angle of the axles with respect to the frames of the planting units is made in order that compensation may be had for the drag of the check-wire in the check-head at one side of the planter, which tends to make the planter run out of line. This tendency to run out of line is also present during side hill planting. The wheels and the axles of the planting units may be angled, as shown by the center lines at the lower right in Figure 1.

Figure 2:
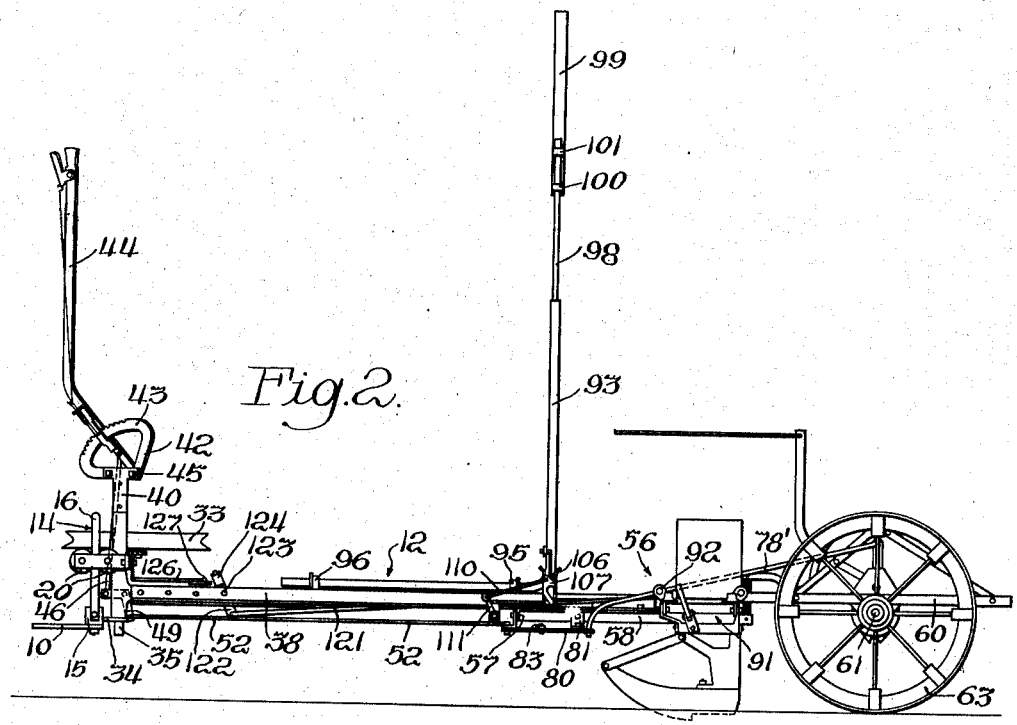
Figure 2 is a side view of the planter taken along the line 2—2 of Figure 1, with the check-wire throwing arm in upright position.

The novel means for throwing the check-wire clear of the planter will now be described. As seen in Figure 1, a check-wire 90 is received at one side of the planter 12 over a sheave 33, extends across the planter back of the tractor over the sheave 32, and is laid down at the same side of the planter as the sheave 32. The check-wire passes through a check-head mechanism 91 having a check-wire guide 92. This mechanism with its guide forms no part of the present invention and is disclosed in the patent to Ford No. 1,376,522, dated May 3, 1921. An arm 93 is pivotally supported by means of an end portion 94 extending at right angles to the remainder of the arm in a bearing member 95 supported by cross angle member 57 and a bearing member 96 supported on a plate member 97 secured to the angle members 38 and 39 adjacent their forward ends. The arm has an extensible portion 98, which in turn carries a channel-shaped member 99 pivoted thereon at 100 and 101. A piece 103 is rigidly secured to the arm 93 and has attached at opposite ends tension springs 104 and 105, which are in turn fixed, respectively, to angle brackets carried by member 57. Normally, the arm 93 would occupy a vertical position, as in Figure 2, being under the action of opposed tension springs, but in operation of the planter it is held in a position such as shown in Figures 1 and 9 with the spring 104 under tension. The arm is held in this position by means of a latch mechanism shown in detail in Figure 6. A U-shaped member 106 is secured to the angle member 38 adjacent its point of connection with the member 57. A latch member 107 is pivoted at 108 on the U-shaped member 106 and holds down the arm 93. A link 110 is connected at one end to the latch 107 and at the other end to a lever 111 fixed at one end of a shaft 112. This shaft 112 is journaled adjacent one end in a bearing member 113 on the angle member 38 and adjacent the other end in a bearing member 114 on the angle member 39. At the said other end of the shaft 112 are also members like those shown in Figure 6 for retaining the arm 93 when it is in a position opposed to that shown in Figure 1. An arm 116 (Figure 5) is secured near a midpoint of the shaft 112 and is under control of a spring 117 attached to it and to a member 118 fixed to the member 57. The action of the spring 117 is such as to pull arm 116 to the right, as viewed in Figure 5, and thus move the lever 111 to the right, as viewed in Figure 6, and keep the latch 107 over the arm 93. A link 121 is attached at one end to the arm 116 and at the other end to a lever 122 pivoted at 123 on the angle members 38 and 39. A free end 124 of the lever 122 extends upwardly above the angle members. An arcuate member 126 is secured to the transversely extending member 29, and has projections 127 and 128 secured thereto. These projections extend outwardly beyond the arcuate member in such a fashion that, if the arcuate member is turned with respect to the planter, one of the projections will contact the free end 124 of the lever 122 and cause the lever to move in a clockwise direction, as viewed in Figure 5. This means that the arm 116 is pulled to the left, and likewise the lever 111, so that the latch 107 is pulled away to release the arm 93. With the release of the arm 93, the spring 104 jerks the arm to a vertical position so as to throw the check-wire over the planter. The spring 105 opposes movement of the arm 93 beyond the vertical. The two springs tend to hold the arm in a cushioned vertical position. However, it is necessary that the check-wire be released from the check-head mechanism 91. For this purpose the guide member 92 is connected with the lever 111 through a flexible member 131, running over a guide pulley 132, and a turnbuckle 133. The arrangement is such that the check-wire will be released from the check-head mechanism by the pulling back of the guide member 92 an instant before the arm 93 is released by the latch 107.

In actual operation, the planter is pulled along by the tractor, as viewed in Figure 1. When the end of one trip across the field is reached, it is desired that the tractor be turned to the left. A turning to the left will cause the projection 127 carried by the arcuate member 126, which is fixed with respect to the tractor and turns with it, to strike the lever 122 and move it in a clockwise direction, so as to pull back the guide member 92 to release the check-wire from the check-head mechanism 91 and to pull the latch 107 away from the arm 93. The check-wire sheave 32 will in the meantime have moved to the dotted line position with the turning of the tractor, thus causing a slack in the check-wire. The check-wire is now thrown from the left hand side of the planter, as shown in Figure 1, over to the right hand side, and the tractor and the planter are free of the check-wire, so that they may be turned around to start another trip back across the field. With the tractor and planter ready for the return trip, the check-wire is again brought into engagement with the check-wire sheaves and the check-head mechanism. On this trip, however, the check-wire is received at the left of Figure 1 over the check-wire sheave 32, brought across over the sheave 33 at the right of the planter, and laid down in engagement with the check-head mechanism 91 at the right side of the planter. The arm 93 in the meantime has been brought down so as to extend toward the right side of the planter under the check-wire, and is held in that position by the latch 107 on the right side of the planter. Then, the four rows are planted, and, at the end of this trip, a turn to the right is made. This means that the check-wire sheave 33 swings back toward the planter, allowing the check-wire to become loose. The projection 128 moves the lever 122, the check-wire guide 92 releases the check-wire from the check head mechanism, and the latch 107 releases the arm 93, so that it may throw the check-wire from the right hand side of the machine over to the left hand side.

It will be seen from the foregoing description that a novel planter has been provided. By means of the arrangement for angling the axles and the wheels of the planter, the tendency of the planter to move out of line with the tractor during side-hill planting is resisted. Furthermore, a novel means for throwing the check-wire clear of a planter at the end of a row has been provided. The wheel angling means is of special advantage with the particular planter shown with its novel check-wire throwing means, because, for the proper operation of the check-wire throwing means, the planter must be pivotally attached to the tractor, and with a pivotal attachment the planter is more liable to deviate from the line followed by the tractor so as to require wheel angling.

The intention is to limit the invention only within the scope of the appended claims.

What is claimed is:

1. In combination, a check-head planter, pulling means therefor, and means actuable upon turning of the pulling means for releasing a check-wire from a check-head of the planter.

2. A construction comprising a check-head planter, check-wire sheaves at opposite sides of the planter, and means for bodily moving a check-wire held by the sheaves and a check-head from one side of the planter to the other.

3. A construction comprising a planter, check-wire sheaves at opposite sides of the planter for receiving a check-wire at one side, guiding it across the planter, and releasing it at the other side, and means for throwing the check-wire across the planter.

4. In combination, a tractor, check-wire sheaves rigidly secured at the rear of the tractor at opposite sides, a check-head planter pivotally secured at the rear of the tractor, and a check wire engaging the check-wire sheaves and the check head of the planter.

5. In combination, a pulling means, a planter attached thereto and having a check-head, check-wire sheaves positioned at opposite sides of the center line of the planter and the pulling means, a check-wire trained about the sheaves and engaging the check-head, and means for moving the check-wire bodily from one side of the planter to the other, said means being operative by a turning of the pulling means.

6. In combination, a pulling means, a check-head planter attached thereto, check-wire sheaves positioned at opposite sides of the center line of the planter and the pulling means, a check-wire trained about the sheaves, and means operative upon the turning of the pulling means for releasing the check-wire from a check-head of the planter and for moving the wire bodily from one side of the planter to the other.

7. In combination, a check-head planter, pulling means therefor, a check-wire engaging the check-head, and means operative upon turning of the pulling means for moving the wire bodily from one side of the planter to the other.

8. In combination, a check-head planter, pulling means therefor, a check-wire engaging the check-head, and means operative upon turning of the pulling means for releasing a check-wire from a check-head of the planter and for throwing the wire over the planter.

9. A construction comprising a planter, check-wire sheaves at opposite sides thereof, a check-wire trained about the sheaves, means for pulling the planter, and means for throwing the check-wire over the planter from one side thereof to the other, said means being operative upon turning of the pulling means.

10. A construction comprising a planter having a check-head at opposite sides thereof, check-wire sheaves at opposite sides thereof, a check-wire trained about the sheaves and engaging a check-head, means for pulling the planter, and means actuated by a turning of the pulling means for releasing a check-wire from a check-head and for throwing the check-wire over the planter.

11. In combination, a tractor, check-wire sheaves fixedly positioned at opposite sides of the tractor, a planter pivotally connected to the tractor and including check-heads at opposite sides thereof, a check-wire trained over the sheaves and extending transversely of the tractor between the sheaves and longitudinally of the tractor in opposite directions beyond the sheaves, a rod pivotally mounted on the planter midway between the check-heads, springs connecting the rod and planter and tending to hold the rod in an upright position, and means actuated by a pivoting of the tractor about the planter upon turning of the tractor for releasing the check-wire from a check-head and for releasing the rod from a horizontal position with one end under the check-wire for throwing the check-wire over the planter.

12. In combination, a tractor, a bar rigidly secured at the rear of the tractor and extending transversely thereof beyond the sides thereof, check-wire sheaves positioned on the bar outwardly of both sides of the tractor, a check-wire trained over the sheaves and extending transversely of the tractor between the sheaves and longitudinally of the tractor in opposite directions beyond the sheaves, an arcuate member rigidly secured at the rear of the tractor and having spaced projections thereon, a planter pivotally connected to the tractor at substantially the center of the arcuate member and having check-heads at opposite sides, a rod pivotally mounted at the center of the planter, springs tending to hold the rod in an upright position, and linkage means extending from connection with the check-heads and the rod to a point immediately adjacent the arcuate member and projections thereon, whereby upon turning of the tractor there is a loosening of the check-wire about one sheave and a projection on the arcuate member contacts the linkage means to effect a release of the check-wire from one check-head and a release of the rod from a horizontal position with its end under the check-wire so as to throw the check-wire over the planter.

13. In combination, a tractor, check-wire sheaves carried at the opposite sides toward the rear thereof, a check-wire trained about the sheaves, a planter frame connected at the rear of the tractor, a rod pivotally mounted on the planter, and opposite spring means connecting the rod and frame for moving the rod from a horizontal position to a cushioned vertical position for throwing a check-wire over the planter frame, said spring means also serving to cushion the rod in its vertical position.

14. In combination, a tractor, a check-head planter pivotally connected to the tractor, check-wire sheaves mounted on the tractor at one end thereof and at opposite sides thereof, a check-wire trained about the sheaves and engaging a check-head, and means for moving the check-wire from one side of the planter to the other.

15. In combination, a tractor, a check-head planter pivotally connected at the rear of the tractor, check-wire sheaves mounted at the rear of the tractor at opposite sides thereof, a check-wire trained about the sheaves and engaging the check-head, and means for moving the check-wire from one side of the planter to the other.

16. In the combination specified in claim 15, said means being operative by a turning of the tractor.

ALEXUS C. LINDGREN.